(12) United States Patent
Brueggemann et al.

(10) Patent No.: US 6,444,730 B1
(45) Date of Patent: Sep. 3, 2002

(54) MIXTURE OF A VEGETABLE RESIDUE AND A WATER-ABSORBING POLYMER PRODUCT

(75) Inventors: Helmut Brueggemann, Moers; Wolfgang Huebner, Kempen, both of (DE)

(73) Assignee: Stockhausen GmbH & Co. KG, Krefeld (DE)

( * ) Notice: Subject to any disclaimer, the term of this patent is extended or adjusted under 35 U.S.C. 154(b) by 0 days.

(21) Appl. No.: 09/520,220

(22) Filed: Mar. 7, 2000

(30) Foreign Application Priority Data

Mar. 8, 1999 (DE) .......................................... 199 10 267

(51) Int. Cl.⁷ .......................... C08L 99/00; C08L 1/00; C08J 3/05; C08K 9/04
(52) U.S. Cl. .......................... 524/35; 524/78; 523/123; 523/129; 523/200
(58) Field of Search .................... 524/78, 35; 523/123, 523/129, 200

(56) References Cited

U.S. PATENT DOCUMENTS

| | | | |
|---|---|---|---|
| 4,448,914 A | * | 5/1984 | Drinkuth et al. |
| 5,018,482 A | * | 5/1991 | Stanislowski et al. |
| 5,264,471 A | * | 11/1993 | Chmelir |
| 5,409,771 A | | 4/1995 | Dahmen et al. |
| 5,712,316 A | | 1/1998 | Dahmen et al. |
| 5,847,031 A | | 12/1998 | Klimmek et al. |

FOREIGN PATENT DOCUMENTS

| | | |
|---|---|---|
| DE | 31 11 019 | 3/1982 |
| DE | 2 608 167 | 12/1987 |
| DE | 40 20 780 | 8/1991 |
| DE | 40 29 591 | 3/1992 |
| DE | 40 29 592 | 3/1992 |
| DE | 40 40 771 C1 | 7/1992 |
| DE | 42 06 856 | 9/1993 |
| DE | 42 06 856 A1 | 9/1993 |
| DE | 44 18 818 | 1/1995 |
| DE | 44 18 818 A1 | 1/1995 |
| DE | 195 29 348 | 2/1997 |
| DE | 196 17 224 | 11/1997 |
| EP | 1 035 091 A1 | 3/1999 |
| GB | 1 529 934 | 9/1977 |
| JP | 03-193179 | 8/1991 |
| JP | 7188647 | 7/1995 |

OTHER PUBLICATIONS

M. Hamdi, Bioprocess Engineering, vol. 8, pp. 209–214, "Future Prospects and Constraints of Olive Mill Wastewaters Use and Treatment: A Review," 1993.
A. G–O. Rodriguez, et al., 17/95 Communication I+D Agroalimentaria, pp. 2–6, "El Riego Con Alpechi. Una Alternativa al Lagunaje" Feb. 16, 1999.
J. Cegarra, et al., International Biodeterioration and Biodegradation, pp. 193–203, "Use of Olive Mill Wastewater Compost for Crop Production," 1996.
F. L. Buchholz, et al., Modern Superabsorbant Polmer Technology, pp. 6–17, "Superabsorbants," 1998.

* cited by examiner

Primary Examiner—Tae H. Yoon
(74) Attorney, Agent, or Firm—Oblon, Spivak, McClelland, Maier & Neustadt, P.C.

(57) ABSTRACT

The invention relates to a storable and transportable and optionally utilizable mixture containing vegetable residues and at least one polymer product which absorbs water and/or aqueous liquids. The invention also relates to a process for producing said mixture and to the use thereof.

22 Claims, No Drawings

MIXTURE OF A VEGETABLE RESIDUE AND A WATER-ABSORBING POLYMER PRODUCT

The invention relates to a storable and transportable and optionally utilizable mixture containing vegetable residues and at least one polymer product which absorbs water and/or aqueous liquids. The invention also relates to a process for producing said mixture and to the use thereof.

In the utilization of vegetable material, e.g. in the production of vegetable oils, fruit juices, fruit foods, flavors, beer and wine, vegetable residues are obtained in large amounts which are found to be problematic with respect to their further use and disposal. In particular, such disposal is made difficult in that the vegetable material is processed partially with addition of water, so that the largely digested vegetable residues are present as an aqueous mixture which is difficult to handle in terms of transportation, storage or further processing as a result of its inhomogeneous solid/liquid state and biological degradation frequently having begun.

For example, such mixtures are obtained in the production of palm oil or olive oil. M. Hamdi, in Bioprocess Engineering 8 (1993) 209–214, and Garcia-Ortiz Rodrigez et al., in Com. I+D Agroalimentaria 17/95, report on the properties of olive residues, their utility options known to date, and their dumping. Due to their suspension-like state and the rapidly beginning, fermentation-like biological degradation, the transportation and/or storage of these residues is only possible at high cost and with massive impacts on the environment.

According to J. Cegarra et al., Internat. Biodeterioration & Biodegradation (1996), 193–203, the option of using these residues as fertilizers is given only in case of fresh materials or in mixtures with other vegetable waste because of the phytotoxic effects generated during biological degradation.

The same or similar problems also arise with vegetable residues from the production of e.g. fruit juices, fruit foods, flavors, and beer.

It was therefore the object of rendering vegetable residues storable and transportable and optionally, utilizable.

Said object is accomplished by providing a storable and transportable and optionally, utilizable mixture containing vegetable residues, at least one polymer product which absorbs water and/or aqueous liquids, and optionally water.

In the meaning of the invention, transportable indicates that no liquid or virtually no liquid will exude from the mixture of the invention despite the shocks occurring during transportation. In the meaning of the invention, storable indicates that the mixture of the invention does not or only marginally undergo biological degradation over a time period of several weeks.

Optionally, the mixture of the invention may contain water, which water may be process water added to the vegetable material for the processing thereof, cell fluid exuded from the cells, or a mixture of same.

The vegetable residues are roots, stalks, blossoms, leaves and/or preferably fruits of plants, optionally crushed, and in particular, vegetable materials from which preferably at least one constituent has been withdrawn. These constituents can be any constituents in the vegetable material. However, these constituents preferably are vegetable oils, fats, fruit juices, mono-, oligo- and/or polysaccharides and/or odorous substances or flavors.

However, the vegetable residues may also be vegetable wastes such as obtained in industrial processing of field crops such as potatoes, sugar beets, vegetables, as well as fruits, e.g. apples. In particular, when using the mixture according to the invention, storable and transportable and optionally, utilizable materials can be obtained from potato manufacturing residues. Among other things, these residues particularly include potato starch process waste water.

Furthermore, the vegetable residues may also be vegetable materials wherein the process of putrefaction has already begun.

According to the invention, the mixture of the invention includes at least one polymer product in addition to the vegetable residues, which polymer product absorbs water and/or aqueous liquids. Surprisingly, by adding these polymer products to the vegetable residues and the water optionally present, a pasty, fast-drying, solid mass is formed.

It is also surprising that following addition of the polymer product, biological degradation of the vegetable residues does not begin or is interrupted in its course, so that environmental disturbances by harmful degradation products and, in particular, by irritating odors are absent or massively reduced and, in particular, the further use of the mixture according to the invention is not restricted.

In the meaning of the invention, polymer products absorbing water and aqueous liquids are all those polymer products which are referred to as superabsorbers and have been described last by F. L. Buchholz and A. T. Graham, J. Wiley & Sons, New York, 1998, pp. 7 to 17.

Preferably, the polymer products are constituted of a) 55–99.9 wt.-% of at least one ethylenically unsaturated, polymerizable monomer which contains acid groups and is present as a salt to at least 25 mole-%, b) 0–40 wt.-% of another ethylenically unsaturated monomer copolymerizable with the monomer according to a), c) 0.01–5.0 wt.-% of at least one crosslinking agent, d) 0–30 wt.-% of a water-soluble polymer, the sum of components a)–d) always being 100 wt.-%.

Furthermore, the polymer products additionally may be crosslinked using a subsequent surface treatment, e.g. according to the process specified in DE 40 20 780 C1. The DE 40 20 780 C1 is hereby incorporated by reference and thus, regarded as part of the disclosure.

The polymer products produced according to DE 44 18 818 C2 and DE 42 06 856 C2 are also preferred. These polymer products are characterized by a high absorption capability for water and/or aqueous liquids and by a constant and high absorption rate and distribution, even under pressure, and they are well-known. DE 44 18 818 C2 and DE 42 06 856 C2 are hereby incorporated by reference and thus, regarded as part of the disclosure.

According to the invention, mixtures of various polymer products absorbing water and/or aqueous liquids can be used.

In addition, the mixture of the invention preferably contains natural and/or modified polysaccharides. Such natural and/or modified polysaccharides are cellulose, starch, cellulose ethers such as carboxymethylcellulose, methylcellulose, methylhydroxyalkylcellulose, hydroxyethylcellulose, ethylcellulose, ethylhydroxyethylcellulose, hydroxypropylcellulose, as well as carboxymethylhydroxyethylcellulose and/or oxidized, anionic starches and anionic starch ethers.

Advantageously, the mixture of the invention is produced by adding the optionally crushed vegetable residues and the water optionally present with at least one polymer product which absorbs water and/or aqueous liquids. Therefore, the invention is also directed to this process according to the invention.

The polymer products preferably are added as powders having a grain size distribution ranging from 10 to 10,000 μm, preferably from 10 to 5,000 μm, and more preferably from 10 to 3,500 μm, and particularly as polymer fines and/or as a water-in-oil dispersion. Also, polymer products having a grain size of less than 200 μm are well-suited, and particularly suitable are polymer particles having a grain size distribution between 10 and 150 μm.

The polymer product is added in such an amount that the mixture of the invention is present as a solid or a cut-resistant mass. It is also preferred to add the polymer product in such an amount that the mixture of the invention after a maximum of 15 minutes is present as a pasty, fast-drying mass and more preferably, however, as a crumbly solid. Relative to the mixture of vegetable residue and water optionally present, the polymer product preferably is added in an amount of from 0.1 to 10.0 wt.-%, more preferably from 0.2 to 5.0 wt.-%, with a range of from 0.25 to 2.5 wt.-% being particularly preferred.

If the vegetable material is to be crushed, the polymer product preferably is added during said crushing. It is also preferred to meter the polymer product prior to, during and/or after removal of one or more constituents from the vegetable material. Addition may also be effected in partial amounts and at various sites of the production process.

Advantageously, the polymer product is metered into the vegetable residues during their conveyance from the respective plant into e.g. a container or a truck, using a screw, for example.

Containing considerable amounts of substances useful for growing plants, such as potassium salts and phosphates, the mixture of the invention can be used as soil improver and/or fertilizer and/or as component in a fertilizer, and as an artificial soil substrate in plant breeding.

On the one hand, when producing the mixtures according to the invention using process waste waters from starch extraction from potatoes, environmentally adverse malodors are avoided and, on the other hand, when using the mixture as fertilizer or fertilizer component, there is a delayed release of compounds containing potassium and nitrogen, so that the disadvantages of direct, fertilizing irrigation are avoided.

In addition, dumping or combustion of the mixture according to the invention is possible without problems.

Furthermore, the mixture of the invention is suitable as an intermediate in the isolation of other constituents or plant components, e.g. by extraction using organic, water-miscible and/or water-insoluble solvents such as n- and/or isoalkanols such as methanol, ethanol and isopropyl alcohol, liquid n- and/or isoalkanes and aromatic hydrocarbons such as n-hexane, cyclohexane or benzene, or by means of steam distillation. For example, these constituents are phenolic compounds such as tyrosol, hydroxytyrosol, oleuropein, caffeic acid, vanillic acid, syringic acid, p-coumarin, o-coumarin, protocatechuic acid, p-hydroxybenzoic acid, and homovanillic acid.

Also, the mixture of the invention is used as raw material in the isolation of other products such as polysaccharides, e.g. in the production of xanthan gum.

Therefore, the present invention is also directed to the above-mentioned uses.

Without limiting the general concept of the invention, the invention will be illustrated with reference to the Examples below.

EXAMPLE 1

Following removal of the oil phase in the production of olive oil according to the continuous two-phase process, 10 g of a polymer product absorbing water and/or aqueous liquids, designated as Stokosorb 410 and supplied by the company Stockhausen GmbH & Co. KG, D-47805 Krefeld, is stirred into 200 g of the recovered fresh vegetable residue in a beaker, using a glass rod. After 2 minutes, the mixture of the invention is a crumbly solid.

EXAMPLE 2

The solid of Example 1 is stored for 3 weeks in a beaker. For comparison, 200 g of fresh vegetable residue obtained in the same way, having an acid value AV=2, is also stored in an open beaker at temperatures ranging from 20 to 25° C. In the comparative experiment, degradation of the vegetable residue can be detected by the odor which is characteristic therefor. The acid value of the partially degraded residue is AV=6. The waste treated with Stokosorb does not exhibit such degradation. Rather, it turns dry.

EXAMPLE 3

Following removal of the oil phase in the production of olive oil using the three-phase process, 10 g of Stokosorb is stirred into 200 g of the liquid residue in a beaker, using a glass rod. After 2 minutes, the mixture of the invention is a solid, crumbly material.

EXAMPLE 4

Example 1 is repeated, but in this case, 20 g of the same polymer product absorbing water and/or aqueous liquids is employed. A solid, crumbly mass is formed. When poured out of the beaker, the mass disintegrates into single, separate particles.

EXAMPLE 5

Example 1 is repeated, but in this case, a vegetable residue from palm nut oil production is used instead of the olive oil residue. After 2 minutes, a solid, crumbly residue is obtained.

EXAMPLE 6

In the production of olive oil, the vegetable residue is conveyed out of the plant using screw conveying. At the front end of the conveying screw, a polymer product absorbing water and/or aqueous liquids, designated as FavorPac and supplied by the company Stockhausen GmbH & Co. KG, is metered in an amount of 1%, relative to the vegetable residue from olive oil extraction. The mixture of the invention discharging at the rear end of the screw after a residence time of 1.5 minutes has a significantly more solid consistency compared to the original vegetable residues from olive oil extraction. Upon further storage, a pasty, cut-resistant mass is formed after 15 minutes which quickly turns dry.

EXAMPLE 7

Example 6 is repeated, but in this case, a polymer product according to Example 3 of DE 42 06 856 is employed as polymer product absorbing water and/or aqueous liquids. The result is a solid mass which quickly turns dry. The result is comparable with Example 6.

EXAMPLE 8

A vegetable mold is mixed with the stored products of Example 2, so that the percentage of the product is 2 wt.-%, relative to the mold. Subsequently, tomato plants are planted into this mixture. The mixture of the invention incorporated in the mold has a positive effect on the growth of the tomato plants. A comparative test performed in parallel using non-treated, fermented vegetable residues from olive oil extraction shows diminished growth of the plants.

EXAMPLE 9

Following storage as described, the products of Example 2 are extracted with n-hexane. A thin layer chromatographic examination demonstrates the formation of significantly different extracts in the mixture of the invention as compared to the non-treated vegetable residues from olive oil extraction.

EXAMPLE 10

Olives are crushed in a cutter (Moulinex company) and subsequently added with 1.5 wt.-% of a polymer product absorbing water and/or aqueous liquids, designated as Favor SXM 100 and supplied by the company Stockhausen GmbH & Co. KG. The exuded aqueous cell fluid is bound by the polymer product, and the olive oil predominantly separates at the surface of the absorber.

EXAMPLE 11

200 g of vegetable residue from olive oil extraction (cf., Example 1) is added with 0.5 g of a polymer product absorbing water and/or aqueous liquids, designated as Favor 990 and supplied by the company Stockhausen GmbH & Co. KG. After 30 minutes, the consistency of the mixture according to the invention clearly has become more solid; it is difficult to squeeze out the water, even under pressure.

EXAMPLE 12

An inhomogeneous vegetable residue obtained following extraction, containing about 75 wt.-% of water, and consisting of an aqueous phase and amounts of olive fruit and kernels, is added with 0.4–0.5 wt.-%, relative to the residue, of a polymer product absorbing water and/or aqueous liquids.

Various products, designated as Stokosorb 400 F, Product T-5066 and Cabloc and supplied by the company Stockhausen GmbH & Co. KG, are employed as polymer products absorbing water and/or aqueous liquids. After 20 minutes, a solid, gel-like, crumbly material has formed in each case (Stage I) which is air-dried at room temperature for 2 days. Each dried residue is added with another amount of non-treated residue so as to form another mixture of solid consistency (Stage II).

The amounts of polymer product added are summarized in Table 1:

| Product | Stokosorb 400 F | Cabloc | Product T 5066 |
|---|---|---|---|
| | | Amount added, kg/ton | |
| Stage I | 4.4 | 4.5 | 5.0 |
| Stage II | 2.0 | 1.5 | 2.2 |

The percentage of polymer product in the final mixture ranges from 0.15 to 0.22 wt.-%, relative to the mixture.

EXAMPLE 13

The residue used in Example 12 is added with an excess of polymer product absorbing water and/or aqueous liquids, ranging from 0.75 to 0.80 wt.-%, relative to the residue (Stage I). Without drying the mixture, another quantity of residue is added and again, a mixture of solid consistency (Stage II) is formed.

The amounts of polymer products added are summarized in Table 2.

| Product | Stokosorb 400 F | Cabloc | Product T 5066 |
|---|---|---|---|
| | | Amount added, kg/ton | |
| Stage I | 7.5 | 7.5 | 8.0 |
| Stage II | 2.5 | 3.3 | 4.4 |

At polymer concentrations ranging from 0.25 to 0.44 wt.-%, relative to the mixture, a gel-like, solid consistency of the residue is obtained.

EXAMPLE 14

100 g of the residue suspension from the continuous two-phase extraction process is added with 2 g of the polymer product absorbing water and/or aqueous liquids, Product T 5066 supplied by the company Stockhausen GmbH & Co. KG. The mixture is extracted with hexane, thereby achieving an oil separation in a yield of 70 wt.-%.

EXAMPLE 15

In a beaker, 200 g of a commercially available applesauce is mixed with 20 g of the polymer absorbing water and/or aqueous liquids, Stokosorb 410 K supplied by the company Stockhausen GmbH & Co. KG, using a glass rod. A solid, crumbly mass is formed.

EXAMPLE 16

The mass obtained in Example 12 is dried for one week at room temperature (20° C., 60% relative humidity). In a beaker, the solid thus obtained is incorporated in 200 g of the above-described vegetable waste from olive oil extraction. Again, a solid, crumbly mass is formed which disintegrates when poured out of the beaker.

EXAMPLE 17

In a beaker, 200 g of a mixture of hops and malt from beer production is mixed with 20 g of the polymer product absorbing water and/or aqueous liquids, Stokosorb 410 K supplied by the company Stockhausen GmbH & Co. KG. A solid, crumbly mass is formed wherein no putrefaction can be observed even after three weeks.

EXAMPLE 18

In a beaker, 200 g of a potato mash is mixed with 20 g of Stokosorb 410 K using a glass rod, and a solid, crumbly mass is formed.

EXAMPLE 19

100 g of a process waste water from starch extraction from potatoes is added with 2.5 g of Stokosorb 400 F. A crumbly, solid mass is formed, which is used as a fertilizer in accordance with Example 8 and has a positive effect on the growth of the tomato plants.

What is claimed is:
1. A storable and transportable vegetable mixture, comprising:
   90–99.9 wt % of a vegetable residue which is a root, a leave, a stalk, a blossom, a fruit or a mixture thereof, and

0.1–10 wt % of at least one polymer product that absorbs water,
wherein the polymer product is obtained from a mixture comprising
a) 55–99.9 wt.-% of at least one ethylenically unsaturated, polymerizable monomer which contains an acid group and is present as a salt to at least 25 mole-%,
b) 0–40 wt.-% of another ethylenically unsaturated monomer copolymerizable with the monomer according to a)
c) 0.01–5.0 wt.-% of at least one crosslinking agent,
d) 0–30 wt.-% of a water-soluble polymer,
the sum of components a)–d) always being 100 wt.-%, and
wherein the polymer product is added in amounts such that the mixture is converted to a pasty, fast-drying mass or a solid.

2. The mixture according to claim 1, wherein the vegetable residue has been obtained from a vegetable material from which at least one constituent has been removed.

3. The mixture according to claim 1, wherein the mixture additionally contains a natural polysaccharide, a modified polysaccharide or a mixture thereof.

4. A process for the production of a storable and/or transportable vegetable mixture comprising:
adding to a waste vegetable residue 0.1 to 10 wt. % of at least one polymer product that absorbs water,
wherein the polymer product is obtained from a mixture comprising
a) 55–99.9 wt.-% of at least one ethylenically unsaturated, polymerizable monomer which contains an acid group and is present as a salt to at least 25 mole-%,
b) 0–40 wt.-% of another ethylenically unsaturated monomer copolymerizable with the monomer according to a)
c) 0.01–5.0 wt.-% of at least one crosslinking agent,
d) 0–30 wt.-% of a water-soluble polymer,
the sum of components a)–d) always being 100 wt.-%,
and wherein the polymer product is added in amounts such that the mixture is converted to a pasty, fast-drying mass or a solid;
wherein the waste vegetable residue is a root, a leave, a stalk, a blossom, a fruit or a mixture thereof;
wherein said vegetable mixture comprises 90–99.9 wt % of said waste vegetable residue.

5. The process according to claim 4, wherein the vegetable material is crushed and then a least one constituent is removed.

6. The process according to claim 5, wherein the polymer product is added during crushing of the vegetable material, prior to, during and/or after removal of the constituent.

7. The process according to claim 4, wherein the polymer product is added as a powder having a grain size distribution ranging from 10 to 10,000 μm and/or as a water-in-oil dispersion.

8. The process according to claim 4, wherein a natural polysaccharide, a modified polysaccharide or a mixture thereof is added.

9. A method of using the mixture according to claim 1, comprising:
adding said mixture to a landfill material or as a combustion additive.

10. A method of using the mixture according to claim 1, comprising:
adding said mixture as a soil improver and/or fertilizer, or as a component in fertilizer, or as soil substrate.

11. A method of using the mixture according to claim 1, comprising:
isolating one or more constituents from vegetable material.

12. The method of claim 11, wherein said constituent is a polyphenolic compound.

13. A method of using the mixture according to claim 1 as raw material in the production of polysaccharides.

14. The mixture according to claim 3, wherein said polysaccharide is selected from the group consisting of cellulose, starch, a cellulose ether, an oxidized, anionic starch and an anionic starch ether.

15. The mixture according to claim 14, wherein said cellulose ether is selected from the group consisting of carboxymethylcellulose, methylcellulose, methylhydroxyalkylcellulose, hydroxyethylcellulose, ethylcellulose, ethylhydroxyethylcellulose, hydroxypropylcellulose, and carboxymethylhydroxyethylcellulose.

16. The process according to claim 8, wherein said polysaccharide is selected from the group consisting of cellulose, starch, a cellulose ether, an oxidized, anionic starch and an anionic starch ether.

17. The process according to claim 16, wherein said cellulose ether is selected from the group consisting of carboxymethylcellulose, methylcellulose, methylhydroxyalkylcellulose, hydroxyethylcellulose, ethylcellulose, ethylhydroxyethylcellulose, hydroxypropylcellulose, and carboxymethylhydroxyethylcellulose.

18. The method according to claim 13, wherein said polysaccharide is xanthan gum.

19. The process according to claim 6, wherein said polymer product is added in an amount of from 0.2 to 5.0 wt %.

20. The process according to claim 19, wherein said polymer product is added in an amount of from 0.25 to 2.50 wt %.

21. The process according to claim 7, wherein said grain size distribution is from 10 to 5000 μm.

22. The process according to claim 7, wherein said grain size distribution is from 10 to 3500 μm.

* * * * *